(12) United States Patent
Kakutani et al.

(10) Patent No.: US 12,152,479 B2
(45) Date of Patent: Nov. 26, 2024

(54) OPERATION ANALYSIS METHOD FOR PRODUCTION PLANT

(71) Applicant: JGC CORPORATION, Kanagawa (JP)

(72) Inventors: Yuzuru Kakutani, Kanagawa (JP);
Teru Asaka, Kanagawa (JP)

(73) Assignee: JGC CORPORATION, Kanagawa (JP)

( * ) Notice: Subject to any disclaimer, the term of this patent is extended or adjusted under 35 U.S.C. 154(b) by 390 days.

(21) Appl. No.: 17/608,997

(22) PCT Filed: May 28, 2019

(86) PCT No.: PCT/JP2019/021095
§ 371 (c)(1),
(2) Date: Nov. 5, 2021

(87) PCT Pub. No.: WO2020/240696
PCT Pub. Date: Dec. 3, 2020

(65) Prior Publication Data
US 2022/0213774 A1 Jul. 7, 2022

(51) Int. Cl.
*E21B 43/26* (2006.01)
*E21B 43/12* (2006.01)
(Continued)

(52) U.S. Cl.
CPC ........ *E21B 43/2605* (2020.05); *E21B 43/121* (2013.01); *E21B 43/30* (2013.01); *G06N 20/00* (2019.01)

(58) Field of Classification Search
None
See application file for complete search history.

(56) References Cited

U.S. PATENT DOCUMENTS

| 9,587,625 B2 | 3/2017 | Zaib et al. |
| 2009/0094982 A1 | 4/2009 | Schulze |
| 2017/0192128 A1* | 7/2017 | Furumoto ............... G01S 17/58 |

FOREIGN PATENT DOCUMENTS

| JP | 2017102760 | 6/2017 |
| WO | 2014020778 | 2/2014 |

(Continued)

OTHER PUBLICATIONS

English machine translation of WO2019097728A1 (Year: 2019).*
(Continued)

*Primary Examiner* — Walter L Lindsay, Jr.
*Assistant Examiner* — Geoffrey T Evans
(74) *Attorney, Agent, or Firm* — JCIPRNET

(57) ABSTRACT

Provided is an operation analysis method for a production plant (1), including: acquiring, with use of a Doppler LIDAR (5), a distribution of three-dimensional wind condition data at positions of an upper space of the production plant (1) and a surrounding space thereof including an arrangement region for an air-cooled heat exchanger (2); acquiring environment data indicating a state of a natural environment that affects operation of the air-cooled heat exchanger (2); and learning, through a numerical analysis with use of a computer, based on a distribution of the three-dimensional wind condition data and on the environment data, a correspondence between a distribution pattern of the three-dimensional wind condition data and the environment data.

8 Claims, 7 Drawing Sheets

(51) Int. Cl.
*E21B 43/30* (2006.01)
*G06N 20/00* (2019.01)

(56) References Cited

FOREIGN PATENT DOCUMENTS

| WO | 2014021236 | 2/2014 |
| WO | 2014103332 | 7/2014 |
| WO | 2016001952 | 1/2016 |
| WO | 2019017421 | 1/2019 |
| WO | 2019097571 | 5/2019 |
| WO | 2019097728 | 5/2019 |

OTHER PUBLICATIONS

English machine translation of WO2014020778A1 (Year: 2014).*
"Office Action of Indonesia Counterpart Application", issued on May 16, 2023, with English translation thereof, p. 1-p. 6.
"International Search Report (Form PCT/ISA/210) of PCT/JP2019/021095," mailed on Aug. 20, 2019 , with English translation thereof, pp. 1-4.
"Office Action of Australia Counterpart Application", issued on Aug. 7, 2024, p. 1-p. 3.

* cited by examiner

OPERATION ANALYSIS METHOD FOR PRODUCTION PLANT

CROSS-REFERENCE TO RELATED APPLICATION

This application is a 371 application of the international PCT application serial no. PCT/JP2019/021095, filed on May 28, 2019. The entirety of the above-mentioned patent application is hereby incorporated by reference herein and made a part of this specification.

TECHNICAL FIELD

The present invention relates to a technology of analyzing operation of a production plant.

BACKGROUND ART

In some cases, a natural gas production plant for liquefaction of natural gas as well as separation and collection of a natural gas liquid, a petroleum refining plant for distillation and desulfurization of crude oil or various intermediate products, and a chemical plant for production of a petroleum chemical product, an intermediate chemical product, or a polymer (all of these plants are hereinafter collectively referred to as "production plant") include an air-cooled heat exchanger (hereinafter also referred to as "ACHE") configured to cool various kinds of fluid (fluid to be cooled). The ACHE is configured to cool the fluid to be cooled by supplying cooling air to a tube bundle formed of bundled tubes, through which the fluid to be cooled flows, with use of a rotary fan.

The ACHE is a device configured to cool refrigerant by taking air in, and cooling performance of the ACHE changes depending on, for example, a temperature of the air to be taken in and a wind speed. The change in cooling performance of the ACHE may significantly affect an operation state of the production plant.

Hitherto, in some cases, a production plant has a wind direction and wind velocity meter provided at a distal end of a pole for a meteorological observation to measure a wind direction and a wind speed (hereinafter collectively referred to as "wind condition") of a wind that blows within plot. However, with the wind direction and wind velocity meter that merely measures the wind condition at one point in plot, it is difficult to grasp, with high accuracy, an influence of the wind condition around ACHEs, which are arranged in a distributed manner in a large area of the plot, on the production plant.

In Patent Literature 1, there is described a technology of acquiring data to be utilized for operating a wind turbine provided to a wind farm, specifically, a technology of acquiring data related to a wind direction and a wind speed by arranging a Doppler LIDAR (Light Detection and Ranging) and a Doppler SODAR (SOnic Detection And Ranging).

However, in Patent Literature 1, there is no description as to a technology of analyzing operation of a production plant including ACHEs.

CITATION LIST

Patent Literature

[Patent Literature 1] U.S. Pat. No. 9,587,625

SUMMARY OF INVENTION

Technical Problem

The present invention has been made under such circumstances, and provides a technology of analyzing operation of a production plant including an air-cooled heat exchanger.

Solution to Problem

According to one embodiment of the present invention, there is provided an operation analysis method for a production plant including an air-cooled heat exchanger, the operation analysis method including: acquiring, with use of a Doppler LIDAR, a distribution of three-dimensional wind condition data indicating a wind direction and a wind speed at positions of an upper space of the production plant and a surrounding space thereof including an arrangement region for the air-cooled heat exchanger; acquiring environment data indicating a state of a natural environment that affects operation of the air-cooled heat exchanger; and learning, through a numerical analysis with use of a computer, based on a distribution of the three-dimensional wind condition data and on the environment data, a correspondence between a distribution pattern of the three-dimensional wind condition data and the environment data.

The operation analysis method for a production plant may have the following features.

(a) The environment data is at least one of temperature data of cooling air taken into the air-cooled heat exchanger, humidity data, wind speed data at an intake port for the cooling air, or wind direction data at the intake port.

(b) The operation analysis method for a production plant further includes predicting, with use of the learned correspondence and a distribution of new three-dimensional wind condition data acquired by the Doppler LIDAR, a state of the natural environment in the future that affects the operation of the production plant. The predicting a state of the natural environment is performed based on a predicted distribution that is obtained by predicting a distribution of three-dimensional wind condition data in the future with use of a distribution of the new three-dimensional wind condition data. At this time, the predicted distribution is obtained through a numerical fluid analysis using a distribution of the new three-dimensional wind condition data.

(c) The operation analysis method for a production plant further includes: predicting an operation condition of the production plant in the future based on a result of predicting the state of the natural environment in the future; and calculating, when the predicted operation condition in the future is an operation condition beyond an operation limitation range of a device included in the production plant, an operation amount of an operation variable for bringing the operation condition to fall within the operation limitation range.

(d) The production plant includes at least one of a gas turbine for a refrigerant compressor or a gas turbine power generator, wherein the Doppler LIDAR is configured to acquire wind condition data for an upper space of the production plant and a surrounding space thereof including an arrangement area for the gas turbine of the refrigerant compressor or a suction unit of the gas turbine power generator, and wherein the environment data includes temperature data of combustion air taken into the gas turbine of the refrigerant compressor or the gas turbine power generator.

Advantageous Effects of Invention

According to this technology, the correspondence between the distribution of the three-dimensional wind condition data for the upper space of the production plant and the surrounding space thereof, which is acquired with use of the Doppler LIDAR, and the environment data indicating the state of the operation environment of the production plant is machine-learned. As a result, an influence of the wind condition around the production plant on the state of the operation environment can be grasped with high accuracy.

DESCRIPTION OF EMBODIMENTS

Now, description is made of an embodiment in which an operation analysis method of this example is applied to a liquefied natural gas (LNG) plant for liquefaction of natural gas (NG). The LNG plant (natural gas production plant) corresponds to a production plant of this example.

Figure 1:
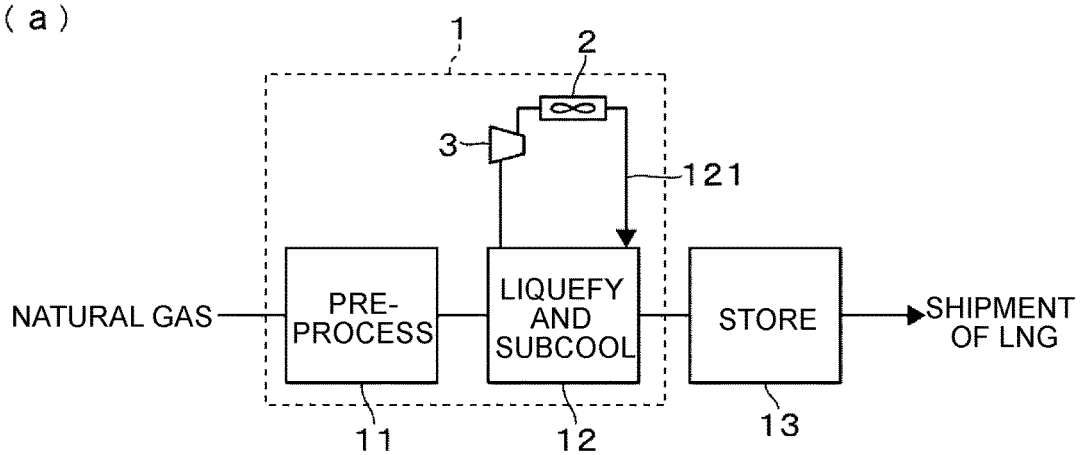
FIG. 1 are block diagrams for schematically illustrating an LNG plant to which an operation analysis method of this example is applied.
Figure 1:
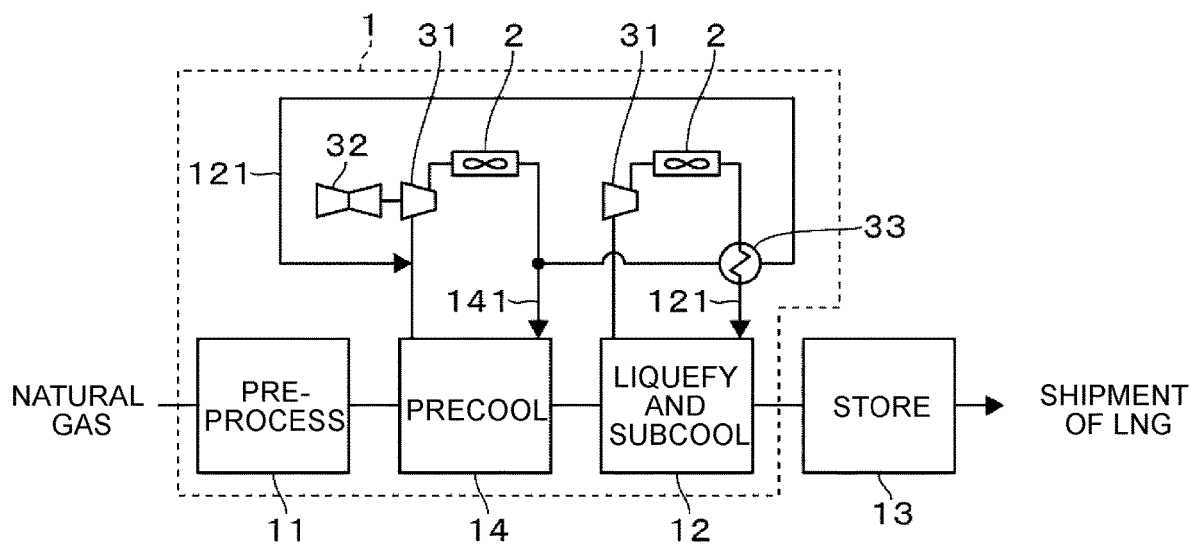

In FIG. 1, (a) is a block diagram for schematically illustrating a configuration example of an LNG plant 1. The LNG plant 1 includes a pre-processing unit 11 and a liquefying and subcooling unit 12. The pre-processing unit 11 is configured to remove various impurities such as mercury, acid gas (for example, hydrogen sulfide, mercaptan, or carbon dioxide), moisture, or heavy fraction, which are contained in NG yielded from a wellhead. The liquefying and subcooling unit 12 is configured to liquefy and subcool the NG, which has been subjected to the removal of the impurities, by cooling the NG with use of refrigerant. The liquefied natural gas (LNG) obtained in the LNG plant 1 is stored in an LNG tank 13 and then is shipped to an outside through, for example, an LNG tanker.

When the liquefying and subcooling unit 12 employs a mixed-refrigerant system, there is used mixed refrigerant (MR) containing refrigerant component selected from, for example, nitrogen, methane, ethane, ethylene, propane, butane, or isopentane as refrigerant for use in liquefying and subcooling the NG (hereinafter also referred to as "liquefying refrigerant"). When the liquefying and subcooling unit 12 employs a single-refrigerant system, there is used a single refrigerant of, for example, propane, ethylene, methane, ethane, or nitrogen as the refrigerant.

The LNG having been liquefied may be subcooled with use of a nitrogen expander cycle in addition to the above-mentioned refrigerant. Further, there is also a case in which part of the LNG is gasified (end flash) so that cold energy obtained through the gasification is effectively used for production of the LNG.

In the liquefying and subcooling unit 12, heat exchange is performed between the NG and the above-mentioned refrigerant through a heat exchanger (not shown). The liquefying and subcooling unit 12 further includes a liquefying refrigerant cycle 121. In the liquefying refrigerant cycle 121, the refrigerant having been gasified through the heat exchange is compressed by a refrigerant compressor 31. After that, the compressed refrigerant is cooled and liquefied by a cooler, and then is re-supplied to the liquefying and subcooling unit 12. In this example, air-cooled heat exchangers (ACHE) 2 are used as the cooler.

The coolers employing the ACHEs 2 may each be, for example, a cooler configured to cool compressed refrigerant steam, a condenser configured to condense cooled steam, or a subcooler configured to subcool liquefied refrigerant.

In (a) of FIG. 1, only one pair of the refrigerant compressor 31 and the ACHE 2 is illustrated in the liquefying refrigerant cycle 121. However, a plurality of pairs of the refrigerant compressor 31 and the ACHE 2 may be provided in series in accordance with pressure stages of refrigerant. Moreover, a plurality of liquefying refrigerant cycles 121 each including the refrigerant compressor 31 and the ACHE 2 may be provided in parallel with respect to the liquefying and subcooling unit 12 in accordance with the amount of refrigerant to be treated.

Next, in FIG. 1, (b) is a block diagram for schematically illustrating the LNG plant 1 including a precooling unit 14. The precooling unit 14 is configured to cool NG, which is to be liquefied, with use of precooling refrigerant. As the precooling refrigerant for use in precooling of the NG, there is used, for example, single refrigerant of propane or mixed refrigerant of ethane and propane.

In the precooling unit 14, heat exchange is performed between the NG and the precooling refrigerant through a heat exchanger (not shown). The precooling unit 14 further includes a precooling refrigerant cycle 141. In the precooling refrigerant cycle 141, the refrigerant having been gasified through the heat exchange is compressed by the refrigerant compressor 31. After that, the compressed refrigerant is cooled and liquefied by a cooler, and then is re-supplied to the precooling unit 14. Also in this example, the ACHE 2 is used as the cooler.

The cooler employing the ACHE 2 may be any of a cooler configured to cool the refrigerant having been compressed, a condenser configured to condense the refrigerant, and a subcooler configured to subcool refrigerant having been liquefied.

The LNG plant 1 illustrated in (b) of FIG. 1 further includes a refrigerant cooling cycle 142. In the refrigerant cooling cycle 142, part of the precooling refrigerant having been liquefied and subcooled is drawn out from the precooling refrigerant cycle 141 to cool liquefying refrigerant that is to be supplied to the liquefying and subcooling unit 12. The precooling refrigerant flowing in the refrigerant cooling cycle 142 cools the liquefying refrigerant on the liquefying refrigerant cycle 121 side in a cooler 33, and then is returned to an inlet of the refrigerant compressor 31 on the precooling refrigerant cycle 141 side.

Further, in (b) of FIG. 1, illustration is also given of an example in which the refrigerant compressor 31 is driven with use of a gas turbine (G/T) 32 as a driver.

Also in the precooling unit 14, a plurality of precooling refrigerant cycles 141 each including the refrigerant compressor 31 and the ACHE 2 may be provided in parallel with respect to the precooling unit 14. Further, a plurality of refrigerant cooling cycles 142 may be connected to the precooling refrigerant cycle 141 in parallel.

In addition to the case in which the ACHE 2 is used for cooling with the liquefying refrigerant or the precooling refrigerant as described with reference to (a) and (b) of FIG. 1, the ACHE 2 may be used also for various processes in the pre-processing unit 11.

For example, in the case of using amine absorption liquid for the process of removing acid gas, the ACHE 2 may be employed as a condenser configured to condense steam drawn out from a column top portion of a regeneration column for the amine absorption liquid.

Figure 2:
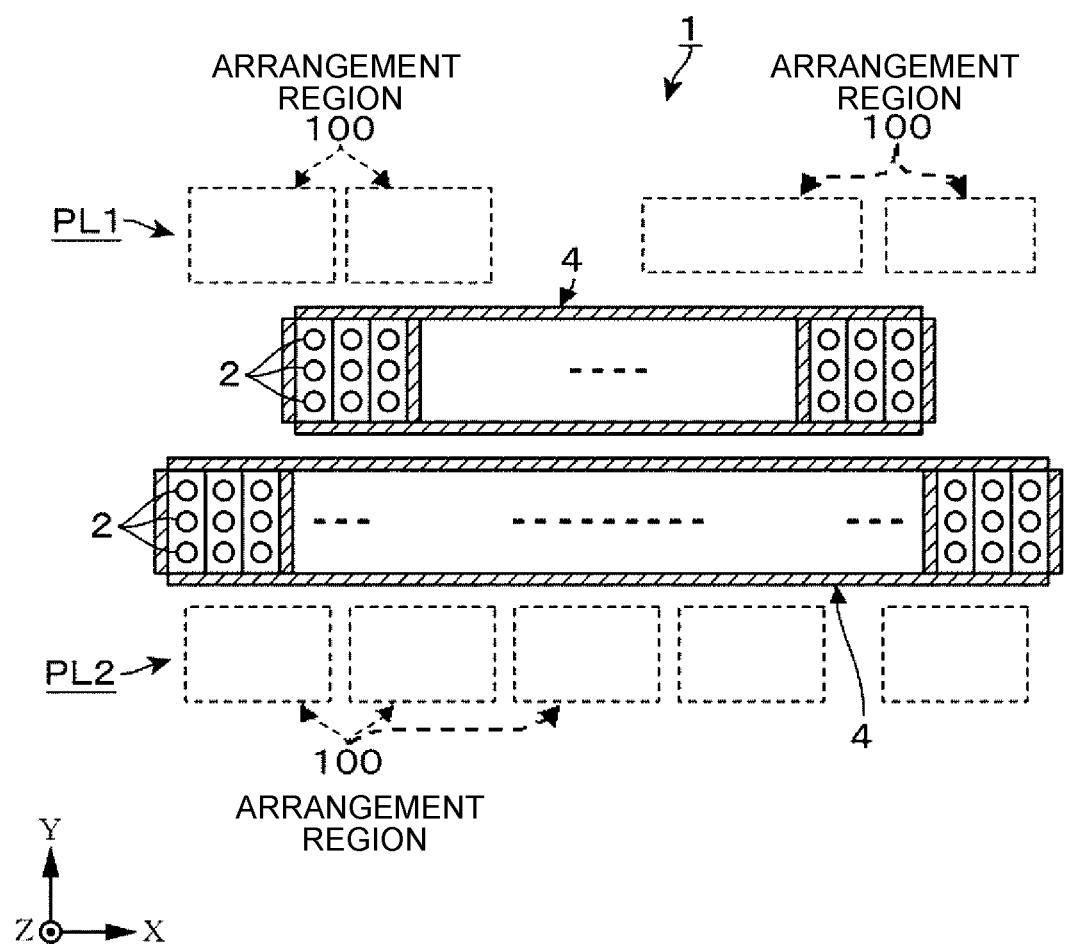
FIG. 2 is a plan view for illustrating an equipment arrangement layout of the LNG plant.

FIG. 2 is an illustration of an example of a plot plan for the LNG plant 1. In a plot for the LNG plant 1, equipment groups PL1 and PL2 forming the LNG plant 1 are arrayed over main pipe racks 4.

For example, the equipment groups PL1 and PL2 include devices forming the pre-processing unit 11 for use in the process of removing various impurities, and devices forming the precooling unit 14 and the liquefying and subcooling unit 12 such as a column tank and a heat exchanger being static devices and pumps being dynamic devices. The broken lines in FIG. 2 indicate arrangement regions 100 of the equipment.

As illustrated in FIG. 2, in the LNG plant 1 of this example, two systems of main pipe racks 4 are arranged adjacent to each other in parallel. Each main pipe rack 4 is formed of a framework structure body having an elongated rectangular shape in top view. As illustrated in a side view of FIG. 4, the main pipe rack 4 holds a plurality of pipes 10 which allows a flow of fluid such as NG and various refrigerants (liquefying refrigerant and precooling refrigerant), which are delivered between the devices forming the above-mentioned equipment groups PL1 and PL2.

On an upper surface of the main pipe rack 4, there are arranged the ACHEs 2 forming the condenser or the subcooler of the liquefying refrigerant cycle 121 provided in the above-mentioned liquefying and subcooling unit 12. Further, when the precooling unit 14 is provided, there are arranged the ACHEs 2 forming the temperature reducer, the condenser, or the subcooler of the precooling refrigerant cycle 141 or the refrigerant cooling cycle 142. In particular, a large number of ACHEs 2 are provided to the precooling refrigerant cycle 141 and the refrigerant cooling cycle 142, and there is a case in which several to several tens of ACHEs 2 are used to form the condenser, and the subcooler and condenser. Therefore, depending on its scale, the LNG plant 1 including more than a hundred of ACHEs 2 in total is employed.

As illustrated in FIG. 2, in the LNG plant 1 of this example, for example, three ACHEs 2 are arrayed along a short-side direction of a rectangle to form a set of the ACHEs 2, and a large number of sets of the ACHEs 2 are arrayed on the upper surface of the main pipe rack 4 having the rectangular shape in top view along a long-side direction of the rectangle. Thus, the upper surface of the main pipe rack 4 corresponds to an arrangement region for those ACHEs 2.

For convenience of illustration, in FIG. 5 described later, illustration is given of the example in which two ACHEs 2 in pair are arranged along the short-side direction of the main pipe rack 4. However, the number of ACHEs is not limited to that given in this example.

Figure 3:
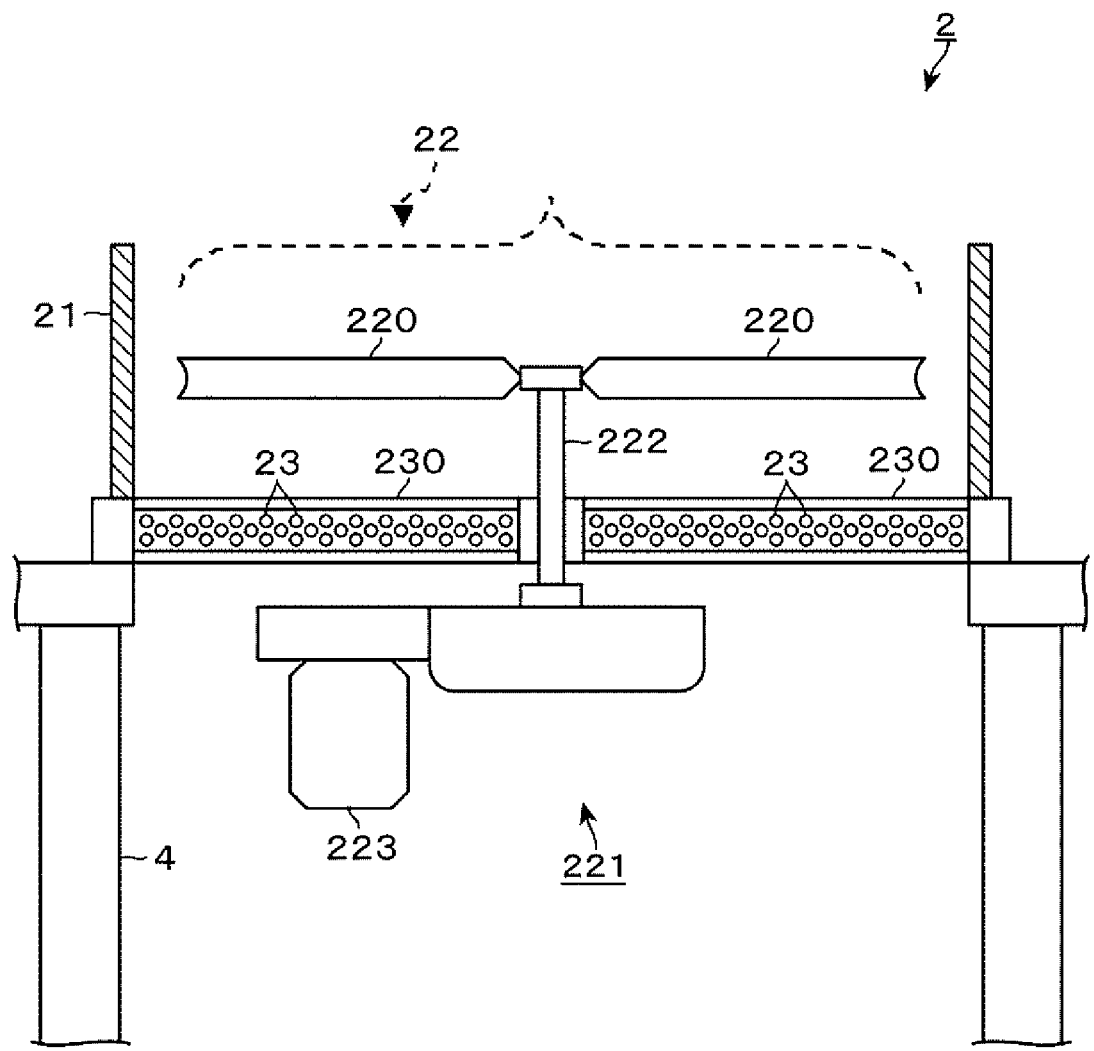
FIG. 3 is a vertical sectional side view for illustrating a configuration example of an ACHE.

Next, with reference to FIG. 3, description is made of a configuration example of the ACHE 2.

The ACHE 2 includes a tube bundle 230 and a fan 22. The tube bundle 230 is formed of a bundle of a large number of tubes (heat transfer tubes) 23, through which fluid to be cooled (fluid to be processed, which is to be handled in the LNG plant 1, such as liquefying refrigerant, precooling refrigerant, or other fluid to be handled in the process of the pre-processing unit) flows. The fan 22 is configured to supply cooling air to the tube bundle 230.

The tube bundle 230 is opened on both upper and lower surfaces, and is capable of allowing cooling air to flow from a lower side to an upper side through gaps each formed between the adjacent tubes 23. Further, a frame body forming a side peripheral portion of the tube bundle 230 is fixed to the upper surface of the framework forming a pipe rack 12. The lower surface of the tube bundle 230 corresponds to an intake port for the cooling air.

The fan 22 includes a plurality of rotor vanes 220, which are provided in such a manner as to radially extend from a rotation center. The rotor vanes 220 each have a base end portion connected to an upper end portion of a rotary shaft 222 at the rotation center, and the rotary shaft 222 is arranged in such a manner as to extend in an up-and-down direction. A lower side of the rotary shaft 222 passes through the tube bundle 230, and a lower end portion of the rotary shaft 222 is connected to a rotary drive unit 221 arranged below the tube bundle 230.

For example, the rotary drive unit 221 may include a pulley mechanism (not shown) and a rotary motor 223 provided at the lower end portion of the rotary shaft 222 so that the rotary shaft 222 is rotated by the rotary motor 223. Alternatively, the rotary shaft 222 may be directly coupled to the rotary motor.

In a region extending upward from an upper surface of a frame body for the tube bundle 230 through a lateral side position of the fan 22, there is provided a duct 21 that forms a discharge passage for allowing air having passed through the tube bundle 230 to flow therethrough. The duct 21 has a tubular shape, and is open upward at a position above the fan 22.

FIG. 3 shows the example of the ACHE 2 of a suction type in which the fan 22 is arranged above the tube bundle 230. However, the ACHE 2 of a push-in type in which the fan 22 is arranged below the tube bundle 230 may also be employed. In this case, a lower side of the rotor vanes 220 forming the fan 22 corresponds to the intake port for the cooling air.

In the LNG plant 1 having the configuration illustrated above, the ACHEs 2 each use the cooling air taken in from the surrounding to cool the fluid to be cooled, and thus are liable to be affected by a state of the surrounding environment.

In this example, focus is given to an influence of a wind that blows around the arrangement positions of the ACHEs 2. For example, in FIG. 4, illustration is given of an example in which a wind W blows from one side toward another side of the main pipe racks 4 which are arranged in series.

Figure 4:
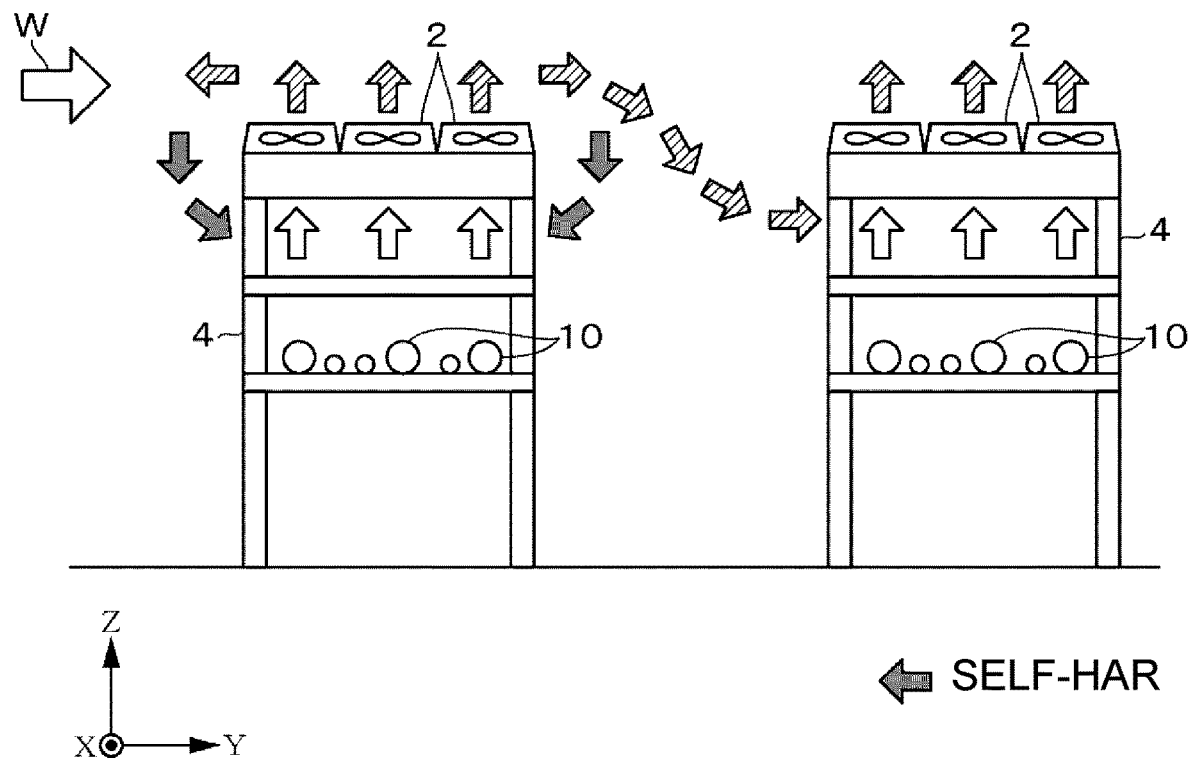
FIG. 4 is a schematic view for illustrating a state of occurrence of HAR.

In FIG. 4, illustration is given of an example in which hot air recirculation (HAR) occurs, in which part of high-temperature discharged air discharged from the ACHEs 2 on a windward side is taken in as the cooling air for the ACHEs 2 on a leeward side to cause an increase in temperature of the cooling air taken into the ACHEs 2 on the leeward side. The increase in temperature of the cooling air may cause degradation in cooling performance of the ACHEs 2.

Further, depending on a wind direction or a wind speed, as illustrated together in FIG. 4, self-HAR may occur, in which part of high-temperature discharged air from some ACHEs 2 may flow around to the lower side of the ACHEs 2 and is taken in again.

The occurrence of the HAR may cause degradation in cooling performance of the ACHEs 2 for the fluid to be cooled. For example, the degradation in cooling performance of the ACHEs 2 configured to cool refrigerant causes an increase in pressure at an outlet of the refrigerant compressor 31 illustrated in (a) and (b) of FIG. 1. In order to maintain the same circulation amount of the refrigerant as that given before the occurrence of the HAR, it is required to increase a load on the refrigerant compressor 31. As a result, an output of a driver (G/T 32 or motor) configured to drive the refrigerant compressor 31 may increase to approach an upper limit output. Alternatively, when there is no room for increasing the load by increasing a rotation speed of the refrigerant compressor 31, a refrigerant circulation amount may decrease to cause reduction in production amount of the LNG.

In this case, when the influence of the HAR is so significant that the output of the driver reaches the upper limit load or that the discharge pressure of the compressor approaches a designed pressure of the compressor, an emergency stop (trip) mechanism for the driver may operate to stop the refrigerant compressor 31. When the refrigerant compressor 31 stops, the operation of the entire LNG plant 1 must be stopped, causing significant opportunity loss.

Further, when the driver of the refrigerant compressor 31 is the G/T 32, or a gas turbine power generator 3 (including G/T 30 in the example illustrated in FIG. 6) is provided to the LNG plant 1, suction temperatures of the G/Ts 32 and 30 may increase depending on the wind condition. The increase in suction temperature may cause degradation in compression performance of the refrigerant compressor 31 and reduction in power generation amount.

As described above, the wind condition of the wind that blows within the plot for the LNG plant 1 may significantly affect the operation of the LNG plant 1. In the viewpoint of grasping the wind condition, for determination of giving a permission to allow pier docking or undocking of an LNG tanker with respect to a cargo handling facility located adjacent to the plot, in some cases, a pole with a wind direction and wind velocity meter is installed.

However, in many cases, a wind direction and wind velocity meter of this kind is provided merely at one location within the plot. Thus, it is difficult to individually and accurately grasp the wind conditions around a large number of ACHEs 2 and the G/Ts 32 and 30 arranged in a distributed manner within the plot for the LNG plant 1. Further, in many cases, the wind conditions around the ACHEs 2 and the G/Ts 32 and 30 are not uniform throughout the plot and may vary depending on respective installation positions.

Figure 5:
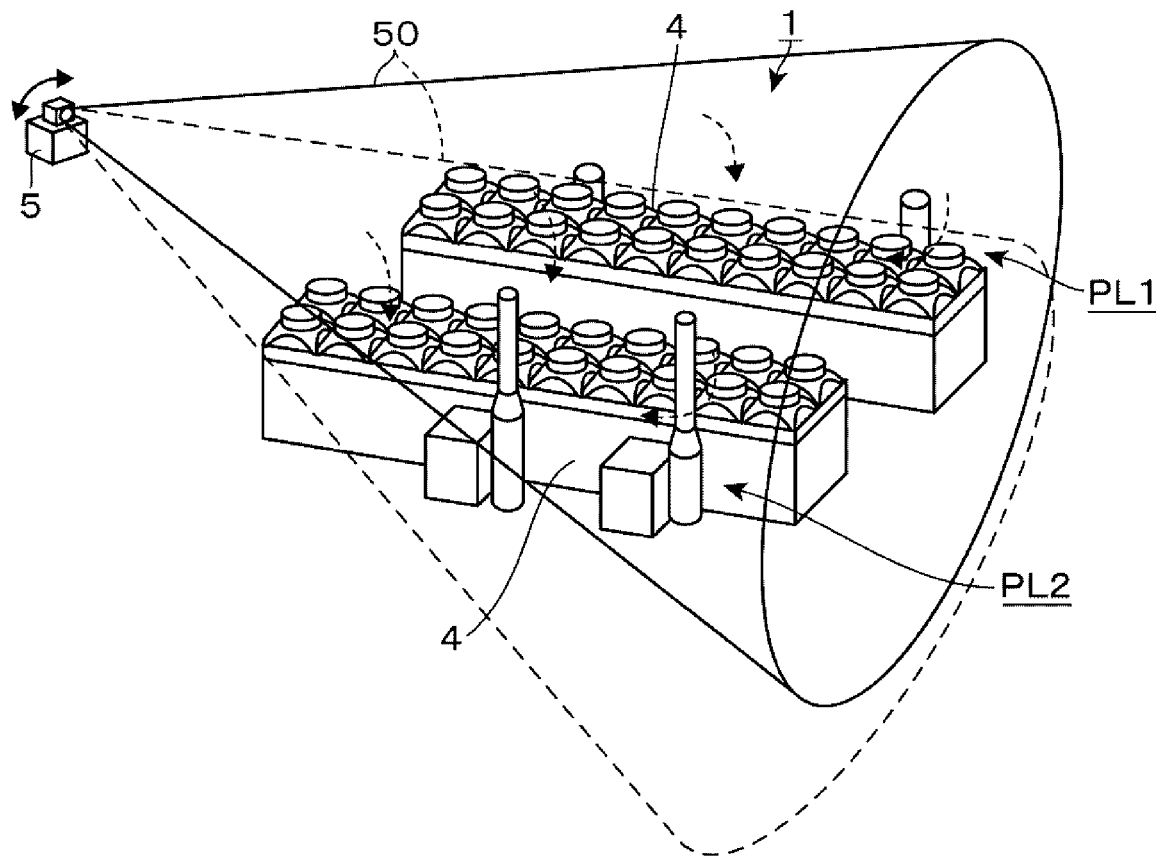
FIG. 5 is a schematic view for illustrating a state of measuring a wind condition in an upper space of the LNG plant and a surrounding space thereof with use of a Doppler LIDAR.

Based on such viewpoints, in this example, a Doppler LIDAR (LIght Detection And Ranging, hereinafter also referred to as "DL") 5 is used to measure, in a three-dimensional manner, wind condition data for the plot within which the LNG plant 1 is installed and a surrounding region thereof (FIG. 5).

A configuration of the DL 5 used in this example is not particularly limited, and there may be used a publicly known DL 5, which is configured to radiate a laser pulse toward an atmosphere of a region to be measured and acquire wind condition (wind direction and wind speed) data of the atmosphere at the radiation position based on a result of detection of a Doppler shift in diffused light of the laser pulse diffused by aerosol contained in the atmosphere. Further, the wind condition data acquired with use of the DL 5 can be visualized with a general-purpose software program in such a manner as to show a three-dimensional wind condition state observed in real time.

In general, the DL 5 is capable of acquiring three-dimensional wind condition data within a hemi-spherical laser pulse radiation range of, for example, about 3 km. The plot for the LNG plant 1 has, for example, a width of about 100 m in a Y-direction of FIG. 1, a length of about 300 m in an X-direction, and a height of about 50 m. Thus, the DL 5 can sufficiently cover the plot as a measurement region.

Figure 6:
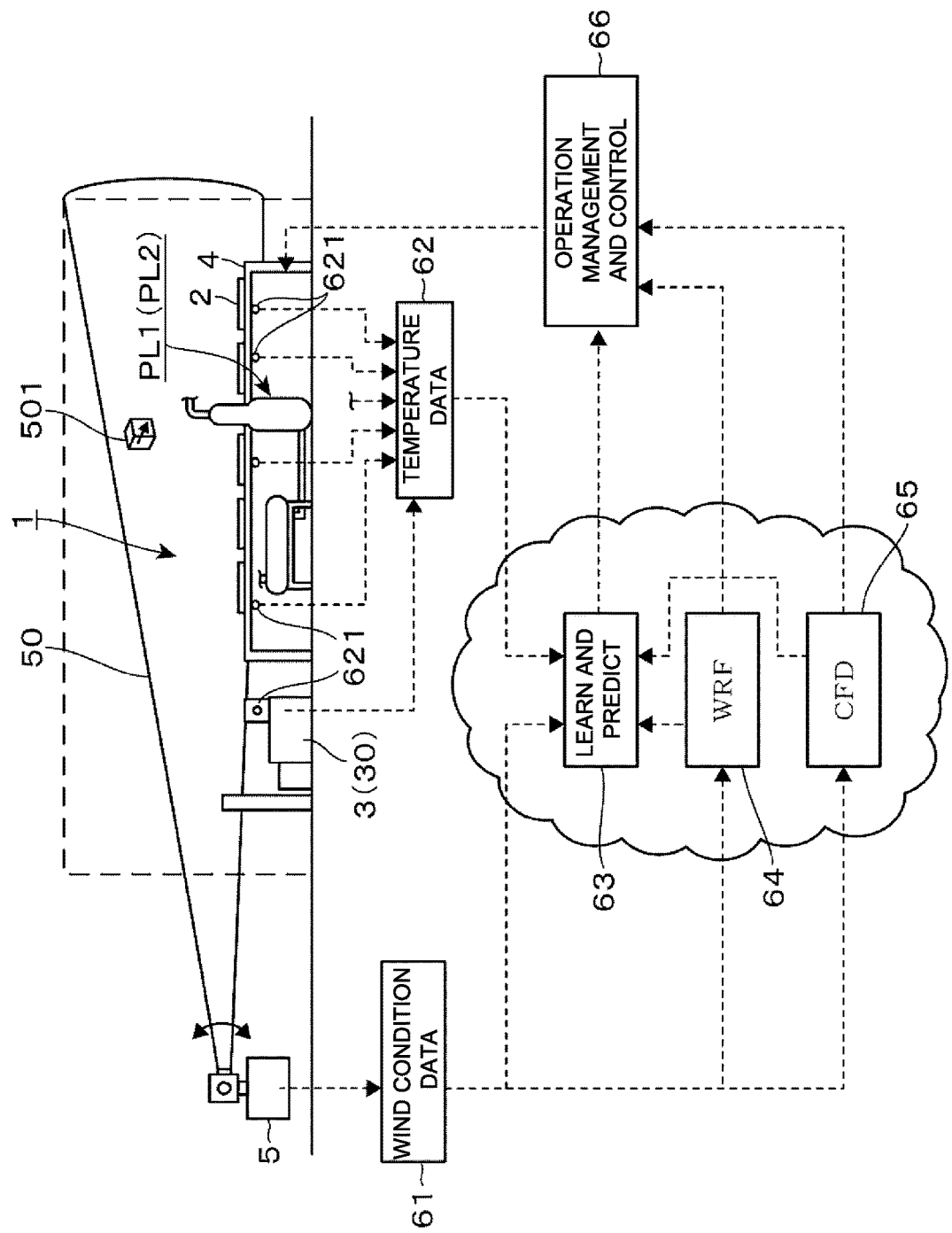
FIG. 6 is a configuration view of an operation analysis system for an LNG plant.

As illustrated in FIG. 5 and FIG. 6, the DL 5 is configured to measure, in a wide range, the wind condition at each position in an upper space of the LNG plant 1 and a surrounding space thereof, including an arrangement region for the ACHEs 2 and an arrangement region for the gas turbine power generator 3 and a suction unit of the G/T 32 of the refrigerant compressor 31. For example, with the entirety of the plot for the LNG plant 1 including the region in which the devices of the LNG plant 1 are arranged being set as an object to be measured, the wind condition measurement for the upper space and the surrounding space can be performed.

For example, a wind that blows downward from an upper side toward a lower side significantly affects occurrence of the HAR. In view of this, when the wind condition data is acquired not only for the height range in the vicinity of the ACHEs 2 but also for the space located several tens of meters above the arrangement positions of the ACHEs 2, a state of changes of the downward wind at every moment can be observed in real time, thereby being capable of grasping the wind condition that affects the occurrence of the HAR in detail and with accuracy.

For example, when the ACHEs 2 are installed on the upper surface of the main pipe rack 4 located at a height of, for example, from about 20 m to about 25 m above the ground, the DL 5 measures the wind condition within a height range of from the upper surface of the main pipe rack 4 to a height of from about 50 m to about 100 m above the ground. In this case, as illustrated in FIG. 5 and FIG. 6, the scanning range of the pulse laser may be moved upward, downward, leftward, and rightward to move a measurement region 50 for the measurement of the wind condition.

Further, it is difficult for the DL 5 to measure a wind condition of a wind that is orthogonal to the radiation direction of the pulse laser. Thus, a plurality of DLs 5 may be provided to measure the wind condition in the upper space of the LNG plant 1 from different directions.

The DL 5 is capable of grasping a wind condition at each position in the above-mentioned measurement region 50 in a measurement minimum unit 501 of several cubic meters (for example, 6 m×6 m×6 m) (FIG. 6).

Through the measurement of the wind condition with use of the DL 5, as schematically indicated by the broken-line arrows in FIG. 5, a state in which a wind that blows downward toward the ACHEs 2 is present in some parts, in which a lateral wind flows around equipment in the LNG plant 1 and blows onto an upper side of the main pipe rack 4 in some parts, and in which the lateral wind flows out from the upper side of the main pipe rack 4 can also be visualized in a three-dimensional manner through display on a monitor or the like.

Further, as illustrated in FIG. 6, a plurality of temperature measurement units 621 each formed of a thermocouple are provided in the LNG plant 1. The temperature measurement units 621 are configured to measure temperatures of air that is present at the intake ports for the cooling air of the ACHEs 2 arranged at respective positions on the upper side of the main pipe rack 4 and air that is present at the suction ports for combustion air of the G/T 30 of the gas turbine power generator 3 and the G/T 32 of the refrigerant compressor 31. In FIG. 6, illustration is given of the example in which the temperature measurement units 621 are provided on the suction side of the ACHEs 2 and at the G/T 30 on the gas turbine power generator 3 side.

With the use of the temperature measurement units 621, the positions at which the temperature of the cooling air increases due to the occurrence of the HAR or an increase in suction temperature of the combustion air can be grasped. The position at which the temperature of the air locally increases is called "hot spot". The temperature data measured by the temperature measurement units 621 corresponds to environment data indicating a state of a natural environment that affects the operation of the LNG plant 1.

FIG. 6 is a block diagram for illustrating a configuration example of a system configured to perform an operation analysis for the LNG plant 1 with use of a distribution of the three-dimensional wind condition data acquired by the DL 5. This system includes a wind condition data acquiring unit 61, a temperature data acquiring unit 62, a learning and predicting unit 63, a weather simulator (which is described as "WRF" in FIG. 6) 64, a fluid simulator (which is similarly described as "CFD") 65, and an operation management and control unit 66. The wind condition data acquiring unit 61 is configured to acquire the three-dimensional wind condition data from the DL 5. The temperature data acquiring unit 62 is configured to acquire the temperature data from each of the temperature measurement units 621. The learning and predicting unit 63 is configured to machine-learn and predict a correspondence between a distribution pattern of the three-dimensional wind condition data and a distribution of the temperature data. The weather simulator 64 is configured to perform weather forecasting in a periphery of the plot for the LNG plant 1. The fluid simulator 65 is configured to perform a numerical fluid analysis (CFD: Computational Fluid Dynamics) for, for example, a flow of air at respective positions in the LNG plant 1. The operation management and control unit 66 is configured to perform operation management and control for the LNG plant 1 with use of the predictions and simulation results.

The wind condition data acquiring unit 61 acquires a distribution of the three-dimensional wind condition data from the DL 5 and then outputs the acquired data, for example, as a data set associated with the time at which the wind condition data is acquired, to the learning and predicting unit 63, the weather simulator 64, and the fluid simulator 65. The temperature data acquiring unit 62 acquires the temperature data from each of the temperature measurement units 621 and then outputs, for example, identification data of each of temperature measurement units 621 and a data set associated with the time at which the temperature data is acquired to the weather simulator 64.

The DL 5 is formed of a computer having a machine-learning program installed therein. The DL 5 associates the data set related to the distribution of the three-dimensional wind condition data acquired from the learning and predicting unit 63 with the data set related to the temperature data acquired from the temperature data acquiring unit 62 along a time axis. As a result, the distribution of the three-dimensional wind condition data given at each time and the distribution of the temperature data (temperature distribution including measurement positions of the temperature data and detected temperatures associated with each other) can be associated with each other.

With the above-mentioned data sets associated with each other, based on the distribution of the three-dimensional wind condition data, determination can be made on whether or not the hot spot is generated, and when the hot spot is generated, determination can be made on at which of the arrangement positions of the ACHEs 2 and the G/Ts 30 and 32 the hot spot is generated. In the following description, the presence or absence of the generation of the hot spot and the generation position in the case of the generation of the hot spot are also collectively referred to as "hot-spot generation condition". The hot-spot generation condition represents a state of the natural environment that affects the operation of the ACHEs 2 and the G/Ts 30 and 32.

Further, the DL 5 uses a large number of data set groups associated as mentioned above to learn a correspondence between the distribution pattern of the three-dimensional wind condition data and the hot-spot generation condition by machine learning. A method of machine learning is not particularly limited, and any publicly known method such as a deep neural network, a support vector regression, a random forest regression, or a partial least square can be used.

The machine learning described above enables the learning and predicting unit 63 to specify the hot-spot generation condition in accordance with the distribution pattern of the three-dimensional wind condition data.

Further, the learning and predicting unit 63 can also predict a hot-spot generation condition in the future (for example, from several minutes to several tens of minutes later) by performing pattern matching on the distribution of the three-dimensional wind condition data newly acquired from the DL 5 and the distribution pattern of the three-dimensional wind condition data for specifying the hot-spot generation condition.

A result of the prediction is output to the operation management and control unit 66 and presented to an operator through a monitor to call attention to operation, and is used as fundamental information for optimum operation control for the LNG plant 1.

Further, a result of the weather simulation by the weather simulator 64 and a result of the fluid simulation by the fluid simulator 65 may be used for the machine learning by the learning and predicting unit 63. Those simulation results can be used to improve the resolution of the distribution pattern of the three-dimensional wind condition data and the distribution of the temperature data throughout the entire space above the LNG plant 1, and a state of the change in those distributions in a chronologically supplemented manner can be visually displayed.

Further, the three-dimensional wind condition data newly acquired from the DL 5 may be used to simulate the distribution of the three-dimensional wind condition data in the future for use in pattern matching for prediction of the hot-spot generation condition.

Next, the weather simulator 64 is formed of a computer having a weather simulator installed therein, which uses, for example, a WRF (Weather Research and Forecasting) model. A range of the weather simulation by the WRF in this example is about 10 km square. The weather simulator 64 is capable of further performing a weather simulation with high accuracy in a local area around the LNG plant 1 by acquiring the data set of the distribution of the three-dimensional wind condition data from the wind condition data acquiring unit 61 and incorporating the data set into the simulation conditions.

Through the simulation, for example, a change in weather is predicted over time so that a distribution (predicted distribution) of three-dimensional wind condition data of several hours later can be acquired. A result of the weather simulation is output to the learning and predicting unit 63 and the operation management and control unit 66.

Further, the fluid simulator 65 is formed of a computer having a CFD program installed therein. The fluid simulator 65 is capable of performing a fluid simulation with higher accuracy by acquiring the data set of the distribution of three-dimensional wind condition data from the wind condition data acquiring unit 61 and incorporating the data set into the simulation conditions.

Through the simulation, prediction data (predicted distribution) of a distribution of three-dimensional wind condition data and a distribution of temperature at positions where the measurement of the wind condition by the DL 5 cannot be performed due to, for example, shading by devices can be acquired. A result of the fluid simulation is output to the learning and predicting unit 63 and the operation management and control unit 66.

Next, the operation management and control unit 66 is formed of a computer system configured to perform operation management and operation control for the LNG plant 1. The operation management and control unit 66 has a function to present, for example, the prediction result of the hot-spot generation condition acquired from the learning and predicting unit 63, the result of the weather simulation by the weather simulator 64, and the result of the fluid simulation by the fluid simulator 65 to an operator through a monitor.

Further, the operation management and control unit 66 may also have a function to evaluate an influence of, for example, an increase in temperature of various kinds of fluid to be cooled through a process simulation based on the prediction result of the hot-spot generation condition and the results of the fluid simulation and the weather simulation acquired from the learning and predicting unit 63, the weather simulator 64, and the fluid simulator 65, and predict the future operation condition in the LNG plant 1.

In this case, as a result of the plant simulation, when it is predicted that a dangerous and unstable operation condition beyond an operation limitation range of the devices included in the LNG plant 1 is to be present, an operation amount of an operation variable for achieving a stable operation condition within the operation limitation range may be calculated and presented to an operator. For example, when it is predicted that an outlet pressure of the refrigerant compressor 31 increases due to degradation in cooling performance of the ACHEs 2 caused by generation of the hot spot, in order to maintain the cooling performance for the LNG, an increase amount of the refrigerant circulation amount may be calculated, or a production reduction amount for adjustment of the LNG production amount may be calculated.

Further, advanced control using the operation amount calculated through the process simulation as a setting value of the operation control for the LNG plant 1 may be performed.

In the operation analysis system of this example, the learning and predicting unit 63, the weather simulator 64, and the fluid simulator 65 may each be formed of a computer provided at a remote location so that communication of various data is performed through computer communication. Further, a configuration of the learning and predicting unit 63 may be divided into a computer having a machine-learning function (learning unit) and a computer having a predicting function (predicting unit). The learning unit may be arranged at a remote location, and the predicting unit may be attached to the operation management and control unit 66. As a matter of course, all of the learning and predicting unit 63, the weather simulator 64, and the fluid simulator 65 may be provided within the plot for the LNG plant 1.

Further, when significant generation of the hot spot that may cause reduction in production amount is predicted, the above-mentioned prediction results may be utilized as fundamental information for equipment measures such as providing a wind shield at a position where high-temperature air blows in.

Figure 7:
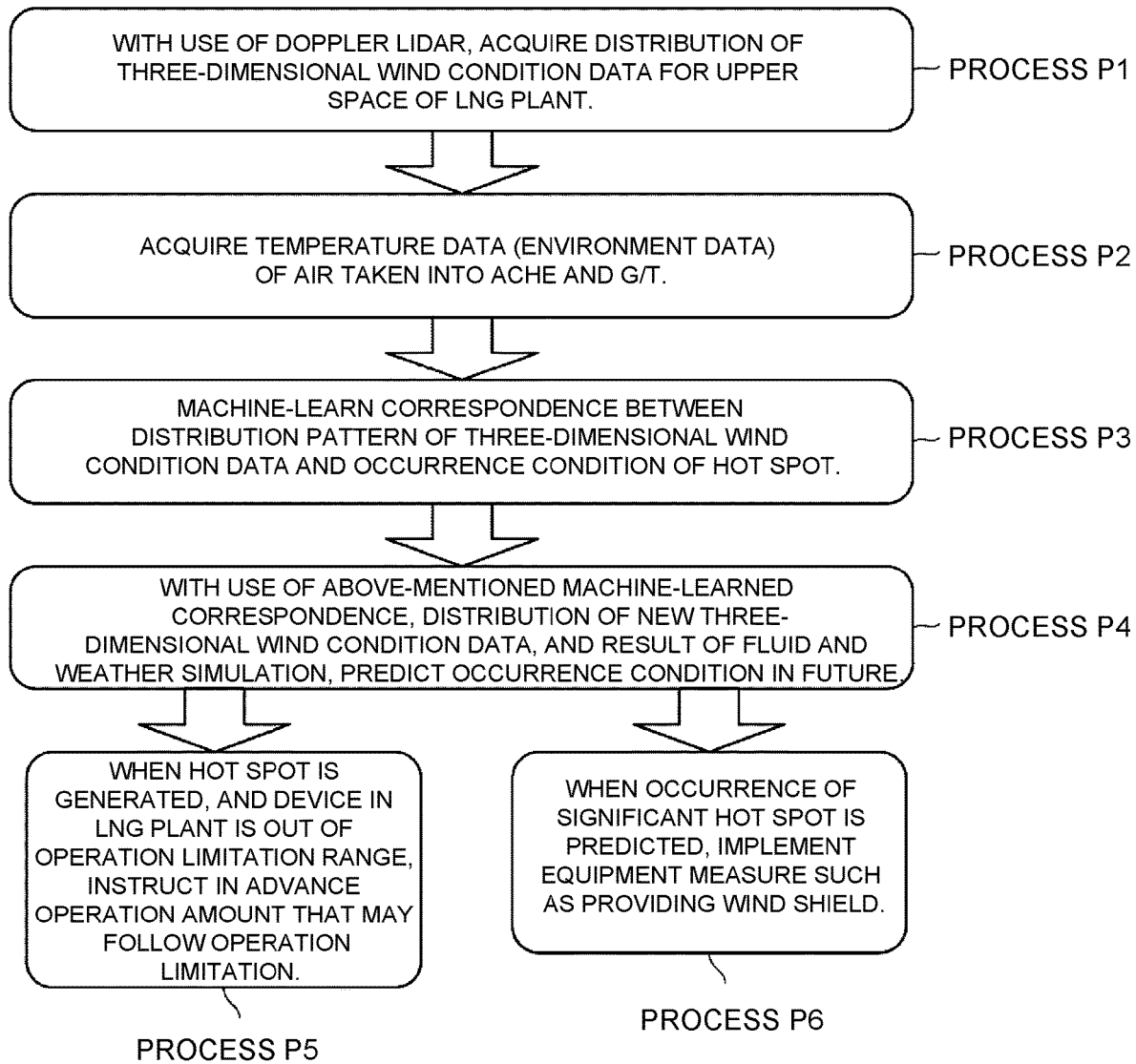
FIG. 7 is an explanatory view for illustrating a procedure of the operation analysis method for an LNG plant.

A method of performing an operation analysis for the LNG plant 1 with use of the operation analysis system described above is described with reference to FIG. 7.

First, with use of the DL 5, the distribution of the three-dimensional wind condition data for the upper space of the LNG plant 1 and the surrounding space thereof is acquired (process P1). Further, the temperature measurement units 621 arranged at respective positions acquire the temperature data of air taken into the ACHEs 2 and the G/Ts 30 and 32 (process P2). Next, with use of the acquired data, the correspondence between the distribution pattern of the three-dimensional wind condition data and the hot-spot generation conditions is machine-learned (process P3).

With use of the above-mentioned machine-learned correspondence, the distribution of new three-dimensional wind condition data, and the results of the fluid and weather simulations, the hot-spot generation condition in the future is predicted (process P4). When the current distribution of the three-dimensional wind condition data acquired from the DL 5 is used, a prediction of from several minutes later to several tens of minutes later can be performed. Further, when the predicted distribution of three-dimensional wind condition data with the results of the weather simulation and the fluid simulation further combined thereto is used, a prediction of several hours later can also be performed.

As a result of the prediction described above, when the hot spot is generated, and the devices within the LNG plant 1 are out of the operation limitation range, for example, the process simulation is performed to present in advance an operation amount (for example, refrigerant circulation amount or LNG production amount) that may follow the operation limitation (process P5). As a result, control of quickly bringing the LNG plant 1 into a stable operation state can be performed.

Further, as described above, when significant generation of the hot spot is predicted, equipment measures such as providing a wind shield at a position where high-temperature air blows in is implemented (process P6).

According to the operation analysis method of this example, the following effect is obtained. The correspondence between the distribution of the three-dimensional wind condition data for the upper space of the LNG plant 1 and the distribution of the temperature data of the air taken into the ACHEs 2 and the G/Ts 30 and 32 (environment data), which are acquired with use of the DL 5, is machine-learned. As a result, the influence of the wind condition in the surrounding of the LNG plant 1 on the hot-spot generation condition can be learned with high accuracy.

Here, the operation analysis for the LNG plant 1 using the three-dimensional wind condition data acquired with use of the DL 5 is not limited to the prediction of the hot-spot generation condition.

For example, when a strong lateral wind blows in a periphery of the ACHE 2, wind-sending performance of the fan 22 may be degraded, and the wind amount of the cooling air supplied to the tube bundle 230 may be insufficient, leading to degradation of the cooling performance. In this case, the wind speed data at the intake port for the cooling air for each of the ACHEs 2 and the wind direction data at the same position correspond to the environment data to be used for determination of the presence or absence of occurrence of insufficiency in wind amount and determination of a position of occurrence.

Meanwhile, the framework forming the main pipe rack 4 and the devices forming the equipment groups PL 1 and PL 2 are arranged outside the intake port for the cooling air located on the lower side of the ACHE 2, and it may be difficult to acquire the distribution of the three-dimensional wind condition data with use of the DL 5. In this case, the distribution of the three-dimensional wind condition data on the intake port side of each of the ACHEs 2 can be predicted based on the fluid simulation that is improved in accuracy with use of the result of the distribution of the three-dimensional wind condition data as mentioned above. Further, another DL 5 configured to measure the wind condition on the intake port side may be separately provided to acquire at least one of the wind speed data or the wind direction data.

After that, based on the distribution of the three-dimensional wind condition data for the upper space of the LNG plant 1 and the surrounding space thereof and the distribution of the wind speed data and the wind direction data on the intake port side of the ACHEs 2, which are acquired from the DL 5, the correspondence between the distribution pattern of the three-dimensional wind condition data and the condition of occurrence of the insufficiency in wind amount is machine-learned. A learning result of the correspondence is then utilized for the prediction of the condition of occurrence of the insufficiency in wind amount and the prediction of the operation condition of the LNG plant 1 in the future, and this point is the same as the prediction of the hot-spot generation condition mentioned above.

In each of the above-mentioned examples, description has been made with the example in which a plurality of ACHEs 2 are arranged on the upper surface of the main pipe rack 4. However, the arrangement positions of the ACHEs 2 to which the operation analysis method of this example is applicable is not limited to such example of the arrangement positions. The ACHEs 2 may be provided on an upper side of a frame base for supporting the ACHEs 2, which is provided on the ground. Also, in this case, a distribution of the three-dimensional wind condition data for the upper space of the LNG plant 1 and the surrounding space thereof including the arrangement region for the ACHEs 2 supported on the frame base is acquired by the DL 5.

Further, the environment data that affects the operation of the LNG plant 1 is not limited to the temperature data of the air taken into the ACHEs 2 and the G/Ts 30 and 32 and the wind speed data and the wind direction data at the intake port for the cooling air of the ACHEs 2. For example, a mist-spraying device may be installed in order to reduce the suction temperature at the ACHEs 2 and the G/Ts 30 and 32. Further, there also exists a plant in which a cooling tower is installed to reduce the temperature of the cooling water. Thus, the environment data may be humidity data of the air to be taken in, which is important for air cooling.

In the above, description has been made of the embodiment in which the operation analysis method of this example is applied to the LNG plant 1. However, the production plant to which the operation analysis method is applicable is not limited to the LNG plant 1. As another example of the natural gas production plant, the operation analysis method may be applied to a gas recovery plant for separating a heavy component from natural gas and shipping the light gas while maintaining the gas state. Further, the operation analysis method of this example is applicable also in the case in which a petroleum refining plant for distillation and desulfurization of crude oil or various intermediate products and a chemical plant for production of a petroleum chemical product, an intermediate chemical product, or a polymer includes the ACHEs 2.

REFERENCE SIGNS LIST

1 LNG plant
2 air-cooled heat exchanger (ACHE)
5 Doppler LIDAR (DL)
61 wind condition data acquiring unit
62 temperature data acquiring unit
63 learning and predicting unit
66 operation management and control unit

The invention claimed is:

1. An operation analysis method for a production plant including an air-cooled heat exchanger, the operation analysis method comprising:
   acquiring, with use of a Doppler LIDAR, a distribution of a three-dimensional wind condition data indicating a wind direction and a wind speed at positions of an upper space of the production plant and a surrounding space thereof including an arrangement region for the air-cooled heat exchanger;
   acquiring an environment data indicating a state of a natural environment that affects an operation of the air-cooled heat exchanger; and
   learning, through a numerical analysis with use of a computer, based on a distribution of the three-dimensional wind condition data and on the environment data, a correspondence between a distribution pattern of the three-dimensional wind condition data and the environment data.

2. The operation analysis method for a production plant according to claim 1, wherein
   the environment data is at least one of a temperature data of a cooling air taken into the air-cooled heat exchanger, a humidity data, a wind speed data at an intake port for the cooling air, or a wind direction data at the intake port.

3. The operation analysis method for a production plant according to claim 1, further comprising:
   predicting, with use of the correspondence that is learned and a distribution of a new three-dimensional wind condition data acquired by the Doppler LIDAR, a state of the natural environment in the future that affects an operation of the production plant.

4. The operation analysis method for a production plant according to claim 3, wherein
   the predicting of the state of the natural environment is performed based on a predicted distribution that is obtained by predicting a distribution of the three-dimensional wind condition data in the future with use of a distribution of the new three-dimensional wind condition data.

5. The operation analysis method for a production plant according to claim 4, wherein
   the predicted distribution is obtained through a numerical fluid analysis using a distribution of the new three-dimensional wind condition data.

6. The operation analysis method for a production plant according to claim 4, wherein
   the predicted distribution is obtained through a weather simulation using a distribution of the new three-dimensional wind condition data.

7. The operation analysis method for a production plant according to claim 3, further comprising:

predicting an operation condition of the production plant in the future based on a result of predicting the state of the natural environment in the future; and calculating, when the predicted operation condition in the future is an operation condition beyond an operation limitation range of a device included in the production plant, an operation amount of an operation variable for bringing the operation condition to fall within the operation limitation range.

8. The operation analysis method for a production plant according to claim 1, wherein the production plant includes at least one of a gas turbine for a refrigerant compressor or a gas turbine power generator, wherein the Doppler LIDAR is configured to acquire wind condition data for an upper space of the production plant and a surrounding space thereof including an arrangement area for the gas turbine of the refrigerant compressor or a suction unit of the gas turbine power generator, and wherein the environment data includes temperature data of combustion air taken into the gas turbine of the refrigerant compressor or the gas turbine power generator.

* * * * *